United States Patent [19]

Bell et al.

[11] Patent Number: 5,401,410
[45] Date of Patent: Mar. 28, 1995

[54] MEMBRANE AND PROCESS FOR THE PRODUCTION THEREOF

[75] Inventors: Carl-Martin Bell, Stuttgart; Reinhold Deppisch, Hechingen; Hermann J. Gohl, Bisingen-Zimmern, all of Germany

[73] Assignee: Gambro Dialysatoren GmbH & Co. KG, Germany

[21] Appl. No.: 69,859

[22] Filed: Jun. 1, 1993

[30] Foreign Application Priority Data

Jun. 12, 1992 [DE] Germany .............. 42 19 218.8

[51] Int. Cl.⁶ ............................................. B01D 39/00
[52] U.S. Cl. ............................. 210/500.41; 210/490; 210/500.37; 210/500.39; 210/500.28; 264/48; 264/49; 428/304.4; 427/245
[58] Field of Search ............... 210/500.41, 500.27, 210/500.28, 651, 490, 500.37, 500.38, 500.39; 264/48, 49; 522/113, 118; 428/304.4; 427/245

[56] References Cited

U.S. PATENT DOCUMENTS

| | | | |
|---|---|---|---|
| 3,855,122 | 12/1974 | Dourganel | 210/490 |
| 4,054,707 | 10/1977 | Quentin | 210/651 |
| 4,127,481 | 11/1978 | Malchesky et al. | 210/638 |
| 4,565,740 | 1/1986 | Gölander et al. | 428/409 |
| 4,613,665 | 9/1986 | Larm | 536/20 |
| 5,008,352 | 4/1991 | Hendy | 210/500.41 |
| 5,246,582 | 9/1993 | Sluma et al. | 210/500.41 |
| 5,279,739 | 1/1994 | Pemawansa | 210/500.41 |

FOREIGN PATENT DOCUMENTS

| | | | |
|---|---|---|---|
| 1197006 | 9/1986 | Japan | 210/500.14 |
| 2038205 | 2/1987 | Japan | 210/500.41 |
| 2079811 | 4/1987 | Japan | 210/500.41 |

*Primary Examiner*—Robert A. Dawson
*Assistant Examiner*—Ana M. Fortuna
*Attorney, Agent, or Firm*—Lerner, David, Littenberg, Krumholz & Mentlik

[57] ABSTRACT

Membranes composed of sulphonated polyaryl ether sulphones are disclosed in which the repetitive polymer units have the formula

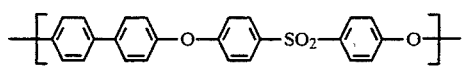

in which the aryl radicals are substituted by $SO_3X$ where X is hydrogen or an alkali metal and the polymer includes from about 0.3 to 0.6 $SO_3X$ radicals per unit. Processes for producing these membranes are also disclosed.

45 Claims, No Drawings

MEMBRANE AND PROCESS FOR THE PRODUCTION THEREOF

The invention concerns permselective membranes which can be used for example in connection with certain medical treatments as for haemodialysis, haemofiltration, plasmapheresis or immunotherapy. They can also be used for a dialysis or ultrafiltration operation generally, as for example for the purification of water.

Permselective membranes of different chemical nature are known for those purposes. For example, membranes of sulphonated polyether sulphones with repetitive structural units of the following formula are known from German laid-open applications (DE-OS) Nos 38 14 759 and 38 14 760:

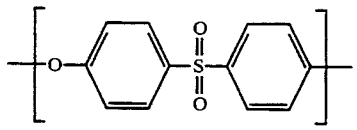

and with a degree of sulphonation of between 0.01 and 0.6. U.S. Pat. No. 3,855,122 also discloses permselective membranes of sulphonated polyaryl ether sulphones. They have repetitive units of the following formula:

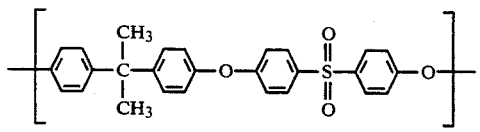

Now the underlying problem of the present invention is that of providing permselective membranes in particular for haemodialysis, which have an improved combination of properties in comparison with known membranes. In particular the invention seeks to provide membranes with vapour sterilisability, nigh diffusion permeability and low activation of blood cells.

Surprisingly, in that respect, an extremely good combination of properties is achieved with membranes comprising a sulphonated polyaryl ether sulphone which, in accordance with the invention, are characterised in that they comprise a polymer of repetitive units of the formula:

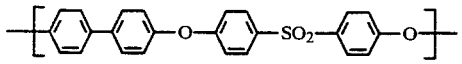

wherein the aryl radicals are substituted by groups $SO_3X$ ($X=H$ or alkali metal) in such a way that there are on average from 0.03 to 0.6 $SO_3X$-radicals per unit of the above formula.

The terminal groups of those polymers may be hydrogen atoms, hydroxyl groups or $SO_3X$-radicals. The sulphonated polyaryl ether sulphones which make up the membranes according to the invention are hydrophilic polymers. They impart to the membranes very high levels of diffusion permeability, a high level of thermal stability and thus vapour sterilisability and low activation of blood cells and they are free of extractable constituents.

Preferred are those sulphonated polyaryl ether sulphones in which there are on average from 0.07 to 0.50 and in particular from 0.15 to 0.25 $SO_3X$-radicals per unit in the above formula. If X does not denote H in the $SO_3X$-radicals, it preferably denotes an alkali metal, in particular sodium or potassium.

The sulphonated polyaryl ether sulphones which are used for the membranes according to the invention preferably have molecular weights (weight-average) in the range of from 20,000 to 70,000, particularly preferably from 35,000 to 50,000.

The combination of properties obtained with the membranes according to the invention is extremely good in particular for haemodialysis purposes and is surprising.

The sulphonated polyaryl ether sulphones which are used for membrane production have a high vitreous transformation temperature. For example a sulphonated polyphenyl sulphone which is used in accordance with the invention, with a degree of sulphonation of 0.45, has a vitreous transformation temperature of 224° C., measured with the Differential Scanning Colorimetry Method with a heating rate of 20° C./minute. By virtue of that high level of thermal stability the membranes according to the invention can be vapour-sterilised, for which purpose they must be resistant at 121° C. water temperature for a period of 20 minutes in a vapour chamber at an increased pressure.

Furthermore the membranes according to the invention have a high degree of diffusion permeability inter alia for substances which must be removed in the haemodialysis operation such as urea. Usually diffusion permeability for chloride is referred to as a comparative scale. That is calculated in accordance with the following equation by measurement of the variation in concentration of NaCl with a different level of concentration in two half-cells which are separated by the membrane in question:

$$P(Cl) = \frac{1}{A.t.\left(\frac{1}{V_1} + \frac{1}{V_2}\right)} + ln\frac{Co}{C_{tNaCl} - C_{tH2O}} \quad (1)$$

In that equation A denotes the membrane area, t denotes the diffusion time, $V_1$ and $V_2$ denote the volumes of the two half-cells, Co denotes the concentration of NaCl at the time zero, $C_{tNaCl}$ denotes the concentration of NaCl at the time t in the half-cell with the sodium chloride at the beginning and $C_{tH2O}$ denotes the concentration of NaCl at the time t in the other half-cell.

A membrane according to the invention comprising a sulphonated polyphenyl sulphone polymer with a degree of sulphonation of 0.5 has a level of diffusion permeability for chloride of 12 to $14 \times 10^{-4}$ cm/s, while usual reverse osmosis membranes as are described in U.S. Pat. No 3,855,122 have levels of diffusion permeability for chloride of less than $0.1 \times 10^{-4}$ cm/s.bar.

The hydraulic permeability $L_p$ for the same membrane according to the invention with a degree of sulphonation of 50% was 5 to $7 \times 10^{-4}$ cm (s.bar). That is determined with a membrane in the form of a flat sheet with an area A of 26 cm² in an amicon membrane cell, wherein water is used to apply a pressure of up to 100 cm Hg. Hydraulic permeability $L_p$ is calculated in accordance with the following equation:

$$L_p = \frac{m}{A \cdot t \cdot \Delta p} \qquad (2)$$

In that equation m denotes the mass of water which passes the membrane in the time t with the trans-membrane pressure $\Delta p$.

A quite substantial and surprising property of the combination of properties obtained with the membranes according to the invention is the low level of activation of blood cells in comparison with known dialysis membranes including sulphonated dialysis membrane polymers with a comparable degree of sulphonation.

For the purposes of assessing the interaction of human mononuclear cells (primarily monocytes and lymphocytes) in suspension with cell culture medium (RPMI 1640, Biochrom, Berlin), in the presence of various membranes, the following test procedure is adopted: mononuclear cells (monocytes and lymphocytes) are isolated from the leucocyte fraction of the total blood of three different blood donors by Ficoll gradient centrifuging. The cells are washed three times in RPMI 1640 which contains 100 μg/ml of penicillin and 100 U/ml of streptomycin. The isolated cells ($4 \times 10^8$ cells/ml) are brought into contact with the respective membranes which are fixed on the bottom side of a tubular reactor. The membrane area is 1.6 cm$^3$. The cells (600 μl of suspension) are incubated for 20 hours at 37° C. in a 5% CO$_2$-atmosphere. After that reaction time the liberation of interleucine-1β is measured by a specific ELISA-procedure in the liquid cell supernatant material. The liberation of interleucine-1β is specific for the degree of cell activation upon contact of the cell with a membrane surface.

Membranes according to the invention with a degree of sulphonation of 0.15, 0.25 and 0.45 were investigated. As comparative membranes, a commercially available cuprophane membrane and a commercially available AN 69 ® (sulphonated polyacrylonitrile) membrane, Trademark of HOSPAL Co., France, were used. Both know membranes are characteristic in respect of strongly hydrophilic membranes of the gel type for haemodialysis and haemodiafiltration respectively. The AN 69 ®-membrane has a degree of sulphonation of 0.9 meq/g corresponding to the degree of sulphonation of 0.45 with the membrane polymers described herein comprising sulphonated polyphenyl sulphone. A negative and a positive control in respect of cell activation was also included in the test. Those are blind samples without membranes, only in the reaction vessel, and with cells stimulated by lipopolysaccharides (1 μg/ml), as lipopolysaccharides are known as effective activators for mononuclear cells.

Although the AN 69 ®-membrane has a high degree of sulphonation, it, like a cuprophane membrane, gives substantial cell activation while the membranes according to the invention with a degree of sulphonation of 0.15, 0.25 and 0.45 gave no or practically no cell activation. The results are set out in following Table 1.

TABLE 1

Interleucine-1B liberation of mononuclear cells with different dialysis membranes

| Material of the dialysis membrane | Interleucine-1B (pg/ml) |
|---|---|
| Blind sample (negative control) | 20 |
| Lipopolysaccharides (positive control) | 2500 |
| Sulphonated polyphenyl sulphone according to the invention | |
| Degree of sulphonation 0.15 | 30 |
| Degree of sulphonation 0.25 | 30 |
| Degree of sulphonation 0.45 | 20 |
| Cuprophane | 340 |
| AN 69 ® | 300 |

Interleucine-1B liberation of at most one eight of that of Cuprophane can be obtained under steady-state conditions.

The membranes according to the invention have a characteristic membrane structure, wherein within the specified range in respect of the degree of sulphonation, lower degrees of sulphonation (for example 0.15) give a finger-like structure, medium degrees of sulphonation (for example 0.25) give a foam structure and higher degrees of sulphonation (for example 0.45) give a homogenous structure.

With the polyaryl ether sulphones used according to the invention, the sulphonation effect does not result in any reduction in molecular weight and thus no molecule decomposition. That results in film-forming properties of the polymer solution, which are important for membrane production, as poor film-forming properties, as occur in the case of the sulphonated polyaryl ether sulphones in accordance with the Examples of U.S. Pat. No 3,855,122, give rise to flaws in the membrane, which result in the membrane being unusable.

A preferred development of the invention provides that the membrane according to the invention as characterised above is additionally modified by reaction of the SO$_3$X-groups with a polymeric amine either with primary or secondary amine functions or with mixed secondary and tertiary amine functions.

Desirably the membrane is so modified with a linear polyethylene imine with secondary amino groups and with molecular weights of between 600 and 50,000 daltons, preferably between 1,000 and 10,000 daltons. It is of the following formula:

wherein n denotes a number which gives a molecular weight in the above range.

The polymeric amine used for the modification operation can also be a branched polyethylene imine of the following formula:

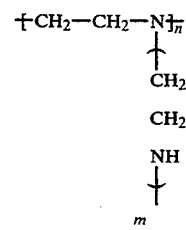

or a primaryamninoterminal polyethylene oxide/polypropylene oxide of the following formula:

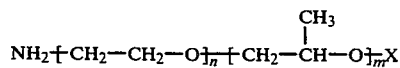

wherein X denotes CH$_3$ or CH$_2$—CH$_2$—NH$_2$ and n and m are again such numbers that the molecular weight of the polymeric amine is in the range of between 600 and 50,000, in particular between 1000 and 10,000 daltons.

The modification operation according to the invention gives membranes with reactive primary or secondary amino groups.

The surface and bulk properties can be adjusted by a variation in respect of the relationship of the SO$_3$X-groups to the amino groups. If the SO$_3$-X-group density is increased in the specified range, the degree of hydrophily is increased, and more amino groups form an ionogenous bond to the SO$_3$X-groups.

By virtue of an increase in the density of the SO$_3$X-groups on the surface, for example by an increase in the degree of sulphonation within the specified range, more polymeric amine is bonded to the surface and an increase in the hydrophily of the surface is produced. Heparin can be covalently bonded to the secondary amino groups using the method of U.S. Pat. Nos. 4,565,740 and 4,613,665 or in accordance with O. Larn, R. Larson, P. Olsson, Biomat. Med. Dev. Artif. Org. 11 (2, 3), pages 161 to 173 (1983), with a high level of surface concentration. Such membranes with heparin which is bonded by way of the polymeric amine are also subject-matter of the invention.

The membranes which are modified at the surface with polymeric amines are further distinguished in that no polymeric amine can be extracted from aqueous solutions. Surprisingly, in the dried condition, they have a markedly raised level of hydrophily relative to membranes which are not modified with polymeric amines.

The membranes according to the invention are produced by a procedure whereby polyphenyl sulphone comprising repetitive units of the following formula:

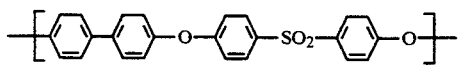

is sulphonated in solution in a concentration of from 5 to 20% (weight/volume) in an organic solvent with chlorosulphonic acid at −20° C. to 30° C., with such matching of the reaction conditions that on average there are from 0.03 to 0.6 SO$_3$X-radicals per unit of the above formula, the sulphonated polyphenyl sulphone is precipitated by the addition of a nonsolvent for the sulphonated polyphenyl sulphone out of a solution of the latter in an organic solvent, in membrane form, the membrane is washed, and possibly the hydrogen of the sulphonic acid groups is exchanged for alkali metal.

The membranes can be obtained in the form of flat sheets or as hollow fibres. In the former case the solution of the sulphonated polyphenyl sulphone is applied either as a thin film, for example of a thickness of from 10 to 100 μm, preferably a thickness of from 50 to 60 μm, on a substrate such as a glass plate, using for example a squeegee or doctor. Instead, the film can also be extruded out of a slot-type nozzle into a bath of the nonsolvent for the sulphonated polyphenyl sulphone. In the production of hollow fibres, the solution of the sulphonated polyphenyl sulphone is extruded through an annular nozzle into the nonsolvent, in which operation nonsolvent for the sulphonated polyphenyl sulphone is additionally urged out of a nozzle within the annular nozzle.

The sulphonation operation is desirably effected at a temperature of from −10° C. to 25° C., particularly desirably in the region of about 20° C. The reaction conditions of the sulphonation operation are desirably so adjusted that no gelling and cross-linking occurs prior to precipitation of the membrane.

With the process according to the invention, it is possible to proceed in such a way that the solution, which is produced in the sulphonation operation, of the sulphonated polyphenyl sulphone, with the above-specified repetitive units, is directly subjected, without preliminary precipitation of the polymer or removal of the solvent, to the membrane formation operation, by precipitation out of the solution. Instead however it is also possible to proceed in such a way that the sulphonated polyphenyl sulphone is firstly precipitated by a nonsolvent out of the solution which is produced as a product in the sulphonation operation, whereafter it is desirably washed and then dissolved again in a solvent.

Methylene chloride, 2-dichloroethane, chloroform or mixtures thereof are advantageously used as the organic solvent for the sulphonation operation. Methylene chloride is preferably employed. The solubility of polyphenyl sulphone in those solvents and thus the rate of dissolution prior to the sulphonation operation can be further increased if from 0.1 to 1% (volume/volume) of dimethyl sulphoxide is added to that solvent for the sulphonation operation. That addition does not interfere with the sulphonation reaction.

Membrane formation is desirably effected in accordance with a per se known phase inversion process by means of a nonsolvent for the polymer, by means of which the membrane is precipitated. Instead, the thin film of the polymer solution which is applied for example to a substrate, as specified above, can also be precipitated with a mixture of a nonsolvent for the polymer and a solvent for the polymer solvent. In that case, the desired porous membrane structure is produced, while the pore structure can be adjusted by virtue of different parameters. Those parameters are in particular the level of polymer concentration, the temperature of the polymer solution and of the nonsolvent and the composition of the nonsolvent system. A preferred temperature in the membrane-formation operation is in the region of about 20° C.

If the solution coming from the sulphonation operation is not used directly for the membrane-formation step, but the sulphonated polysulphone is precipitated prior to the membrane-formation step, isopropanol, acetone, ethanol, methanol, acetic acid and/or acetic acid anhydride are desirably used as a nonsolvent for that precipitation operation. The precipitated and washed sulphonated polyphenyl sulphone is then desirably dissolved for the production of the membrane in N-methyl pyrrolidone, N,N-dimethylacetamide, N,N-dimethyiformamide and/or dimethylsulphoxide. The nonsolvent for membrane precipitation is desirably water, acetone, isopropanol, methanol, ethanol, acetic acid, acetic acid anhydride or a mixture thereof, preferably water.

The preferred amine-modified membranes are produced by a procedure wherein either the polymeric amine is added to the spinning solution or the sulphonated polyaryl ether sulphone is treated with a solution of the polymeric amine. With the addition of the polymeric amine to the polymer solution, the latter desirably contains from 5 to 20% by weight and in particular from 8 to 14% by weight of sulphonated polyaryl ether sulphone and from 0.5 to 15% by weight of polymeric amine. However the sulphonated polyaryl ether sulphone can also be modified in the solid condition with an aqueous solution of the polymeric amine, desirably in the range of concentration of between 0.5 and 50, in particular between 0.5 and 5%.

By virtue of an increase in the density of the SO$_3$X-groups at the surface of the polymer, for example by an increase in the degree of sulphonation in the specified range, more polymeric amine is bonded to the surface and an increase in the degree of hydrophily of the surface is achieved. An increase in the amount of bonded polymeric amine is achieved with the same reaction time by increasing the level of concentration of the polymeric amine in the treatment solution, while when the level of concentration is reduced, sulphone groups are not amino-functionalised and are available for further reaction.

Subsequently to the amine-modification operation, heparin can be covalently bonded to the membrane using the above-mentioned methods.

Using the described materials and methods, it is possible to produce membranes with different pore sizes (1 nm to 50 $\mu$m), and the membranes can be used in different blood purification procedures such as haemodialysis, haemofiltration, plasmaphoresis or selective adsorption treatment procedures.

The invention is described in further detail by reference to the following Examples:

EXAMPLE 1

20 g of polphenyl sulphone with the above-specified repetitive monomer units is dissolved in 380 ml of distilled methylene chloride and cooled to a temperature in the range of from $-10°$ C. to $22°$ C. The specific temperature is set out in Table 2 below.

Various amounts of distilled chlorosulphonic acid, as specified in Table 2, were dissolved in 60 ml of distilled methylene chloride and cooled. The two solutions obtained were simultaneously dripped into a 1 liter reaction container maintained at a constant temperature of between $-10°$ C. and $22°$ C., with vigorous agitation, for a period of 1 hour. After complete mixing, the reaction mixture was agitated for a further half an hour and the polymer produced was precipitated in cold isopropanol, thoroughly washed with isopropanol, dried and powdered. The degree of sulphonation was determined by back-titration of a dispersion of the polymer product in an adjusted alkaline methanol solution and can be controlled by the reaction temperature and the amount of chlorosulphonic acid used (see Table 2). Sulphate and evaporation residue as well as the yield were additionally determined.

The evaporation residue was determined by extraction of the sulphonated polyphenyl sulphone by dispersion thereof for a period of 3 days in isopropanol, filtering off the polymer, evaporating the filtrate and weighing off the residue. The entry n.d. means that it was not possible to determine any residues.

EXAMPLE 2

Sulphonated polyphenyl sulphane was dissolved as a 10 to 19% by weight solution, preferably 16% by weight solution, in N-methyl pyrrolidone as a solvent, with agitation, at ambient temperature, for 3 hours. The polymer solution was filtered through a 5–10 $\mu$m Teflon membrane, treated for 10 minutes with ultrasound to degass the solution, cast with a doctor or squeegee onto a glass plate and directly precipitated in a water bath. The resulting membrane thickness was about 50 $\mu$m.

The membrane was converted into the Na$^+$-form by dipping for 1 to 2 hours into a 1 m NaOH-solution. The resulting membranes were tested prior and after a vapour sterilisation operation in regard to hydraulic permeability and diffusion permeability for chloride with a 0.9% NaCl-solution. The vapour sterilisation operation was effected in a pressure vessel which was heated to 121° C., for a period of 20 minutes, with subsequent slow cooling.

The degree of hydraulic permeability prior to the vapour sterilisation operation was 5 to $7 \times 10^{-4}$ cm (s.bar) while after vapour sterilisation it was 4 to $60 \times 10^{-4}$ cm (s.bar). Diffusion permeability for chloride prior to vapour sterilisation was 12 to $14 \times 10^{-4}$ cm (s.bar) while after vapour sterilisation it was 12 to $13 \times 10^{-4}$ cm/s.bar. It will be evident that no substantial change occurred due to the vapour sterilisation operation and the membranes according to the invention are thermally stable and thus vapour-sterilisable.

EXAMPLE 3

Membranes were produced from sulphonated polyphenyl sulphone (see Example 1), in accordance with Example 2.

The membranes were introduced moist into a 2% aqueous solution of the polymeric amine set cut in Table 3 and reacted over 6 hours, then washed with water overnight, subjected to vapour sterilisation and dried to a constant weight at 45° C. The surfaces modified in that way gave two characteristic properties:

1. In the dried condition the modification caused a clear increase in the membrane efficiency (see Table 3).
2. The membrane surfaces bad reactive amino groups to which large amounts of heparin can be bonded, with the above-quoted literature. The amino groups can be qualitatively and quantitatively ascertained by methylene blue colouring or titration.

TABLE 2

| Test No. | Temp (°C.) | Amount of chlorosulphonic acid (mol) | Degree of sulphonation | Sulphate (%) | Evaporation residue (%) | Yield (%) |
|---|---|---|---|---|---|---|
| 1 | −10 | 0.02 | 0.07 | n.d. | n.d. | 85 |
| 2 | −10 | 0.05 | 0.15 | n.d. | n.d. | 86 |
| 3 | −10 | 0.1 | 0.50 | n.d. | n.d. | 86 |
| 4 | 22 | 0.02 | 0.12 | n.d. | n.d. | 99 |
| 5 | 22 | 0.04 | 0.28 | n.d. | n.d. | 81 |
| 6 | 22 | 0.05 | 0.40 | n.d. | n.d. | 85 |
| 7 | 22 | 0.06 | 0.47 | n.d. | n.d. | 86 |

TABLE 3

Membrane efficiency data
consisting of sulphonated polyphenyl sulphone with different
degrees of sulphonation with and without modification with
polymeric amine. The membrane was produced from a 13% solution in NMP by precipitation in water at 20° C. The polymeric
amine used was Jeffamin ® M 715 (aminoterminated polyethylene
oxide-polypropelene oxide copolymer), from Texaco of Hamburg.

| Degree of sulphonation | Amine modification | Lp [$10^{-4}$ cm/s. bar] | P (Cl) [$10^{-4}$ cm/s] |
|---|---|---|---|
| 12 | without | <1 | <0.1 |
| 12 | Jeffamin ® | 32 | 9.7 |
| 24 | without | <1 | 10.1 |
| 24 | Jeffamin ® | 6 | 7.1 |
| 22 | polymeric amine with secondary amine functions | 5 | 1.0 |

The membranes were extracted with water over 16 hours at 60° C. and the extract was tested for Jeffamin ® with the Dragendorff analysis method (A. Berger, Zeitschrift fur Analytische Chemie 196, 251 (1963). No Jeffamin ® was found in the extract (detection limit 0.1 mg/g dry substance).

EXAMPLE 4

As an alternative to Example 3 the polymeric amine was dissolved directly into the spinning solution and membranes were made therefrom, which carry reactive primary and secondary amine functions respectively both at the surface and also in the bulk phase.

In comparison with membranes without polymeric amine, the membranes also have increased membrane efficiency data after membrane drying (see Table 4). The polymeric amine can be analytically determined by the Dragendorff method on the membrane surface.

TABLE 4

Membrane efficiency data from
sulphonated polyphenyl sulphone (sPESU) with different degrees
of sulphonation with and without modification with Jeffamin ®
M 2070 in the spinning solution, produced by precipitation in
water at 20° C. (membrane dried at 45° C. to constant weight).

| Degree of sulphonation | Spinning solution composition in NMP | Lp [$10^{-4}$ cm/s. bar] | P (Cl) [$10^{-4}$ cm/s] |
|---|---|---|---|
| 7 | 13% PESU | 5 | <0.1 |
| 7 | 13.5% sPESU 3% Jeffamin ® 0.5% water | 150 | 12.6 |
| 12 | 13% sPESU | <1 | <0.1 |
| 12 | 13% sPESU 5.4% Jeffamin ® 1.0% water | 120 | 11.1 |

We claim:

1. A membrane of a sulphonated polyaryl ether sulphone polymer comprising repetitive units of the formula:

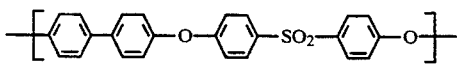

wherein the aryl radicals are so substituted by SO$_3$X-groups wherein X denotes a hydrogen atom or an alkali metal atom, that there are on average from 0.03 to 0.6 SO$_3$X-radicals per unit of the above formula, said SO$_3$X-groups of said polymer being reacted with a polymeric amine.

2. The membrane of claim 1 wherein said polymeric amine is selected from the group consisting of polymeric amines with primary amine functions, polymeric amines with secondary amine functions and polymeric amines with both secondary and tertiary amine functions.

3. The membrane of claim 1 wherein said polymeric amine is a linear polyethylene imine with a molecular weight of from 600 to 50,000 daltons.

4. The membrane of claim 3 wherein said polymeric amine is a linear polyethylene imine having a molecular weight of from 1,000 to 10,000 daltons.

5. The membrane of claim wherein said polymeric amine is selected from the group consisting of branched polyethylene imine and a primaryaminoterminal polyethylene oxide/propylene oxide, said polymeric amine having a molecular weight of from 600 to 50,000 daltons.

6. The membrane of claim 5 wherein said polymeric amine is selected from the group consisting of branched polyethylene imine and a primaryaminoterminal polyethylene oxide/propylene oxide with a molecular weight of from 1,000 to 10,000 daltons.

7. The membrane of claims 1, 2, 3, 5, 4 or 6 wherein there are an average of from 0.07 to 0.50 SO$_3$X-radicals in the polymer per unit of the above formula.

8. The membrane of claim 7 wherein there is an average of from 0.15 to 0.25 SO$_3$X-radicals in the polymer per unit of the above formula.

9. The membrane of claims 1 , 2, 3, 5, 4 or 6 wherein X denotes an alkali metal in said polymer.

10. The membrane of claim 9 wherein in the polymer, X denotes sodium or potassium.

11. The membrane of claims 1, 2, 3, or 5 wherein said polymer has a weight-average molecular weight in the range of from 20,000 to 70,000 daltons.

12. The membrane of claim 11 wherein the polymer has a weight-average molecular weight in the range of from 35,000 to 50,000 daltons.

13. The membrane of claims 1, 2, 3 or 5 wherein said membrane interleucine-$\beta$-liberation from mononuclear cells that under steady-state conditions is at most $\frac{1}{3}$ that of cuprophane.

14. A process for the production of a membrane comprising the steps of:
sulphonating a polyphenyl sulphone in a solution which includes a solvent;
reacting said sulphonated polyphenyl sulphone with a polymeric amine in said solution;
and precipitating a membrane from said solution.

15. The process of claim 14 wherein said polymeric amine is added to said solution at a concentration of from 0.5 to 15% by weight when compared to said solution of sulphonated polyphenyl sulphone.

16. A process for the production of a membrane comprising the steps of:
   sulphonating a polyphenyl sulphone in a solution which includes a solvent;
   precipitating a membrane from said solution;
   and reacting said membrane with a polymeric amine.

17. The processes of claims 14 or 16 wherein said polyphenyl sulphone has a concentration of between about 5 and about 20% (weight/volume).

18. The process of claim 17 wherein said step of sulphonating said polyphenyl sulphone is conducted at a temperature of between about −20° C. and about 30° C.

19. The process of claim 18 wherein said step of sulphonating said polyphenyl sulphone is conducted at a temperature of between about −10° C. to about 25° C.

20. The process of claims 14 and 16 wherein the reaction conditions of said sulphonating step are adjusted such that no gelling or cross-linking occurs prior to precipitation.

21. The process of claims 14 or 16 wherein said polymeric amine is selected from the group consisting of a linear polyethylene imine, a branched polyethylene imine, and a primaryaminoterminal polyethylene oxide/polypropylene oxide.

22. The process of claim 21, wherein said polymeric amine has a weight-average molecular weight of from about 600 through about 50,000 daltons.

23. The process of claim 22 wherein said polymeric amine has a molecular weight in the range of from 1,000 to 10,000 daltons.

24. The process of claims 14 or 16 further comprising heparin covalently bonded to the sulphonated polyphenyl sulphone which has been modified by said polymeric amine.

25. The process according to claims 14 or 16 wherein prior to precipitating the membrane said sulphonated polyphenyl sulphone is precipitated with a nonsolvent and then dissolved again in said solvent.

26. The process of claim 25 wherein said nonsolvent is selected from the group consisting of isopropanol, acetone, ethanol, methanol, acetic acid and acetic acid anhydride.

27. The process of claim 26 wherein said nonsolvent is isopropanol.

28. The method of claim 24 wherein said solvent is selected from the group consisting of N-methyl pyrrolidone, N,N-dimethyl acetamide, N,N-dimethyl formamide and dimethyl sulphoxide.

29. The method of claim 25 wherein said precipitation step with said nonsolvent occurs prior to membrane formation with the precipitate being redissolved into said solvent.

30. The process of claims 14 or 16 wherein said membrane is precipitated in a phase inversion process using a nonsolvent for said polymer.

31. The process of claim 30 wherein said nonsolvent for said polymer is mixed with said solvent.

32. The process of claim 30 wherein said nonsolvent is selected from the group consisting of water, acetone, isopropanol, methanol, ethanol, acetic acid and acetic acid anhydride.

33. The process of claim 32 wherein said nonsolvent is water.

34. The process of claims 14 or 16 wherein said step of sulphonating said polyphenyl sulphone in said solution occurs in a solvent selected from the group consisting of methylene chloride, 1,2-dichloroethane and chloroform.

35. The process of claim 34 wherein said solvent is methylene chloride.

36. The process of claims 14 or 16 wherein 0.1 to 1% by volume (volume/volume) of dimethyl sulphonxide is added to said solvent during said step of sulphonating step.

37. The method of claims 14 or 16 further comprising adding chlorosulphonic acid to said solvent prior to said sulphonating step.

38. The process of claims 14 and 16 wherein said polyphenyl sulphone includes repetitive units having the formula:

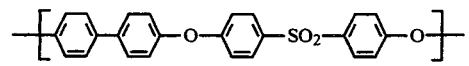

39. The process of claim 38 wherein said sulphonated polyphenyl sulphone has an average of from 0.03 to 0.6 SO₃H-radicals per unit.

40. The process of claim 16 wherein said sulphonated polyphenyl sulphone membrane is treated with an aqueous solution of a polymeric amine, having a concentration of from 0.1 to 50% by weight of said sulphonated polyphenyl sulphone.

41. A process for the production of a membrane comprising the steps of:
   sulphonating a polyphenyl sulphone comprised of repetitive units having the following formula

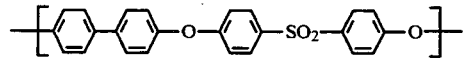

in a solution which includes a solvent, such that said resulting sulphonated polyphenyl sulphone includes 0.03 to 0.6 SO₃H-radicals per unit;
   reacting said sulphonated polyphenyl sulphone with a polymeric amine in said solution;
   and participating a membrane from said solution.

42. The process of claim 41 wherein said polymeric amine is added to said solution at a concentration of from 0.5 to 15% by weight when compared to said solution of sulphonated polyphenyl sulphone.

43. A process for the production of a membrane comprising the steps of:
   sulphonating a polyphenyl sulphone comprised of repetitive units having the following formula

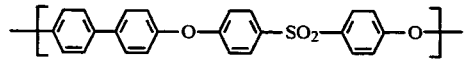

in a solution which includes a solvent such that said resulting sulphonated polyphenyl sulphone includes 0.03 to 0.6 SO₃H-radicals per unit;
   participating a membrane from said solution;
   and reacting said membrane with a polymeric amine.

44. The process of claims 41 or 43 wherein said sulphonating reaction occurs at a temperature of between about −10° and about 25° C.

45. The process of claim 43 wherein said sulphonated polyphenyl sulphone membrane is treated with an aqueous solution of a polymeric amine, having a concentration of from 0.1 to 50% by weight of said sulphonated polyphenyl sulphone.

* * * * *

UNITED STATES PATENT AND TRADEMARK OFFICE
CERTIFICATE OF CORRECTION

PATENT NO. : 5,401,410
DATED : March 28, 1995
INVENTOR(S) : Bell et al.

It is certified that error appears in the above-indentified patent and that said Letters Patent is hereby corrected as shown below:

Column 3, line 62, "1B" should read --1β--.
Column 3, line 64, "1B" should read --1β--.
Column 4, line 2 "1B" should read --1β--.
Column 4, line 11, "1B" should read --1β--.
Column 4, line 63, "primaryamninoterminal" should read --primaryaminoterminal--.
Column 8, line 48, "bad" should read --had--.
Column 10, line 11, "claim wherein" should read --claim 1 wherein--.
Column 10, line 22, "5, 4" should read --4, 5--.
Column 10, line 28, "5, 4" should read --4, 5--.
Column 10, line 57, "membrane interleucine" should read --membrane has an interleucine--.
Column 12, line 6, "sulphonxide" should read --sulphoxide--.

Signed and Sealed this

Fifth Day of September, 1995

Attest:

BRUCE LEHMAN

Attesting Officer

Commissioner of Patents and Trademarks